March 6, 1934.  A. JUELSON  1,949,421

BAKE PAN PARTITION

Filed Jan. 27, 1933  2 Sheets-Sheet 1

Agnes Juelson
Inventor

By C. A. Snow & Co.
Attorneys.

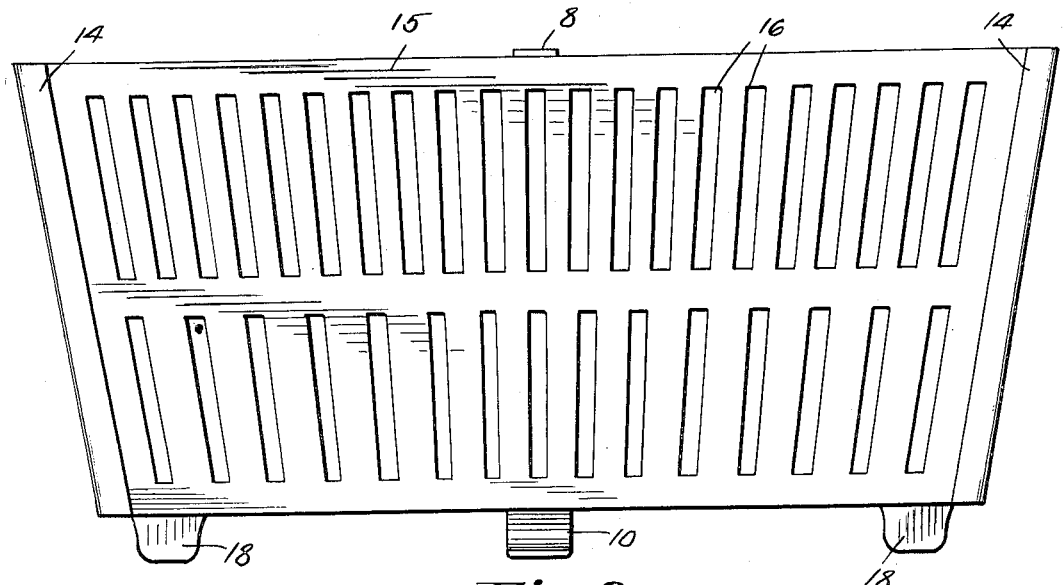
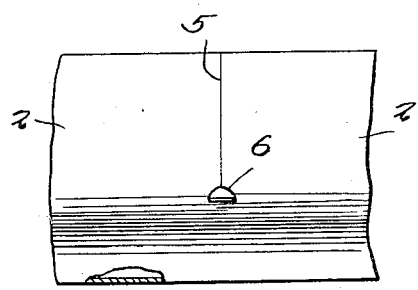
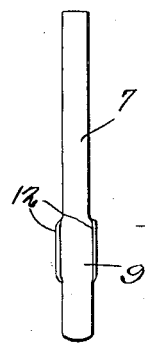
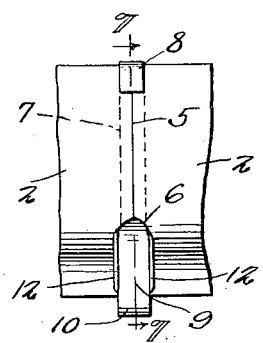
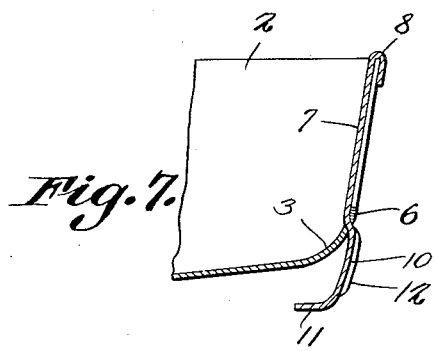

Patented Mar. 6, 1934

1,949,421

UNITED STATES PATENT OFFICE 1,949,421

BAKE PAN PARTITION

Agnes Juelson, Chicago, Ill.

Application January 27, 1933, Serial No. 653,878

4 Claims. (Cl. 53—6)

This invention aims to provide a novel auxiliary pan, adapted to contain dressing or vegetables, and to be placed in a roasting or baking pan, thereby bringing about a roasting or baking of the dressing or vegetable in the auxiliary pan, at the same time that the meat, fowl, or fish is being roasted or baked in the main pan. The invention aims, moreover, to provide an auxiliary pan which will fit in one corner of a standard roasting pan, thereby occupying space which is never filled by the roasting material that is in the main pan.

The invention has, as a further object, the provision of an auxiliary pan which may be used with any ordinary roasting utensil. A further object of the invention is to render it unnecessary to remove the bone from the roasting material, in order to insert the dressing, it being a matter of common knowledge that when the bone is removed, the savor of the meat is impaired. It is proposed to provide a means whereby the flavor of the meat may pass through slits in the auxiliary pan, into the dressing that is in the auxiliary pan, the dressing, nevertheless, being held above the grease or gravy in the main baking pan, the contents of the auxiliary pan being characterized by a lack of excess fat or moisture.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 3 is an elevation of the auxiliary pan;

Fig. 4 is an elevation showing a part of the auxiliary pan;

Fig. 5 is a plan of the strip which forms one leg of the pan and holds the ends of the walls of the pan together;

Fig. 6 is an elevation showing a part of the pan, with the leg in place;

Fig. 7 is a section on the line 7—7 of Fig. 6.

Figure 2:
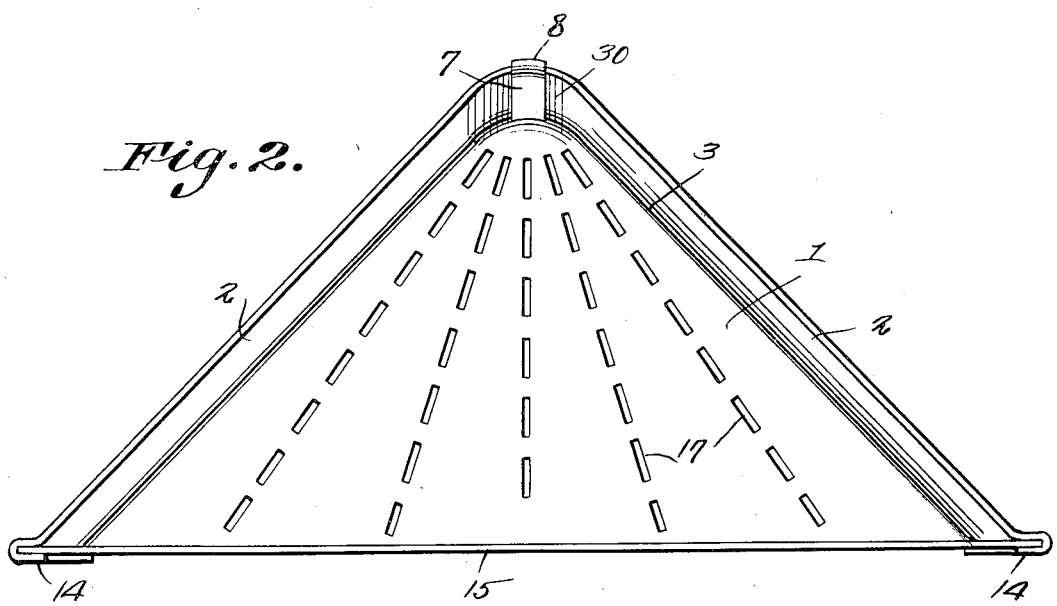
Fig. 2 is a top plan of the auxiliary pan.

The invention embodies an auxiliary pan, made of any desired metal, the auxiliary pan being of approximately triangular outline, as shown in Fig. 2. The pan comprises a bottom 1 and side walls 2, formed in one-piece, the side walls defining one corner 30 of the pan. Where the bottom 1 joins the side walls 2, the pan is rounded, as shown at 3 in Fig. 7, so that the internal angles of the pan may be cleaned out readily.

At the corner 3, the side walls 2 meet along a line 5, shown in Figs. 6 and 4. At the lower end of the line 5, there is an opening 6 in the pan, extending toward the bottom 1, this opening being formed partly in one wall of the pan, and partly in the other wall thereof.

There is provided a metal strip 7, shown in Fig. 5. This strip extends upwardly on the inside of the pan, at the corner 3, and covers the line 5 at the ends of the walls 2. At its upper end, the strip 7 is formed into a hook 8, engaged tightly over the upper edge of the pan. The lower end 9 of the strip 7 is broadened somewhat and extends outwardly through the opening 6, and downwardly, to form a supporting leg 10. The lower end of the leg 10 is turned inwardly to fashion a foot 11. Along its edges, the part 9 of the strip 7 has two upright flanges 12. The flanges 12 serve to stiffen the leg 10, and this is especially true, since the upper ends of the flanges bear against the ends 2 of the pan, on each side of the opening 6. The opening 6 tapers somewhat at its upper end, and the strip 7, where it passes through the opening 6, engages the parts 2 at the sides of the opening. The strip 7, thus, is prevented from moving upwardly, and it cannot move downwardly, because the hook 8 is engaged over the upper edge of the pan. If desired, the strip 7 may be held in place by soldering, spot-welding, or in any other appropriate way.

Figure 1:
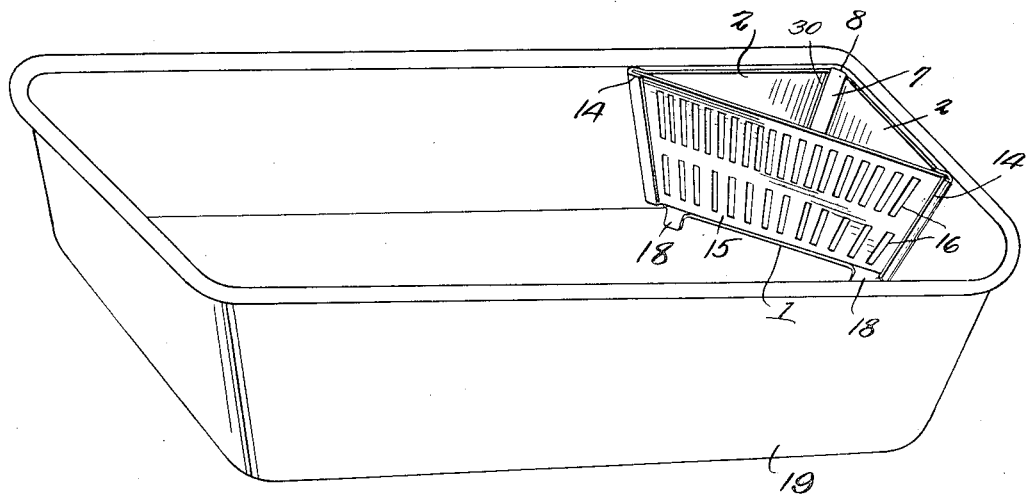
Fig. 1 is a view showing the auxiliary pan in place in the large roasting pan.

On the forward edges of the side walls 2 of the auxiliary pan, there are upright guides 14, in which a gate 15 is slidably and removably mounted. The gate 15, when in place, rests on the bottom 1 of the pan. The gate 15 has slits 16, and these slits, together with slits 17 in the bottom 1, enable the flavor of the meat to get to all parts of the dressing in the auxiliary pan. On the forward edge of the bottom 1, there are down-turned legs 18, which, with the leg 10, support the auxiliary pan in spaced relation to the bottom of the main pan 19, and prevent the gravy or grease in the main pan from finding its way into the dressing or other material in the auxiliary pan. The auxiliary pan, it is to be noted from Fig. 1, fits closely in one corner of the main pan 19, out of the way of the roast in the main pan. The gate 15 may be removed to permit the dressing to be taken readily out of the auxiliary pan. The side walls 2 of the auxiliary pan may have a slight slope, as shown in Fig. 2, to conform to the slope of the side walls of the main pan 19.

Having thus described the invention, what is claimed is:

1. The combination with a main, portable, imperforate roasting and baking pan, of an auxiliary pan of approximately triangular outline, shaped to fit in an angle of the main pan and to contain dressing or the like, the auxiliary pan being provided with perforations which admit the flavor of the material in the main pan into the material in the auxiliary pan, the auxiliary pan having legs which space the bottom of the auxiliary pan from the bottom of the main pan, thereby preventing grease or gravy on the bottom of the main pan from finding its way into the material in the auxiliary pan, through the said openings, the upper portion of the auxiliary pan being clear of the upper edge of the main pan.

2. An auxiliary pan of approximately triangular outline, shaped to fit in the angle of a main roasting pan and to contain dressing or the like, the auxiliary pan being provided with perforations which admit the flavor of the material in the main pan into the material in the auxiliary pan, the auxiliary pan having legs which space the bottom of the auxiliary pan from the bottom of the main pan, thereby preventing grease or gravy in the main pan from finding its way into the material in the auxiliary pan, through the said openings, the side walls of the pan being provided with guides, a gate being removably and slidably mounted in the guides, the gate cooperating with the side walls of the pan to form the third side wall of the pan.

3. An auxiliary pan of the class described, comprising a bottom and side walls formed integrally with the bottom, the ends of the side walls being brought together approximately, along a meeting line, there being an opening in the ends of the side walls at the lower end of the meeting line, and a strip extended downwardly along the inside of the pan and covering the meeting line, the strip being provided at its upper end with a hook engaged with the upper edge of the ends of the side walls, the strip extending outwardly through the opening and engaging the side walls near to the upper end of the opening, the strip being extended downwardly below the bottom, to form a supporting leg.

4. An auxiliary pan of the class described, comprising a bottom and side walls formed integrally with the bottom, the ends of the side walls being brought together approximately, along a meeting line, there being an opening in the ends of the side walls at the lower end of the meeting line, and a strip extended downwardly along the inside of the pan and covering the meeting line, the strip being provided at its upper end with a hook engaged with the upper edge of the ends of the side walls, the strip extending outwardly through the opening and engaging the side walls near to the upper end of the opening, the strip being extended downwardly below the bottom, to form a supporting leg, the lower portion of the strip being provided with outstanding flanges extended downwardly on the leg, to reenforce the leg, the upper ends of the flanges engaging the ends of the side wall of the pan, on each side of the opening.

AGNES JUELSON.